(12) United States Patent
Kluesner et al.

(10) Patent No.: US 10,189,749 B2
(45) Date of Patent: Jan. 29, 2019

(54) HUMIC ACID LIGNITE COAL BASED LIQUID FERTILIZER

(71) Applicant: Innovative Crop Solutions, Inc., Radcliffe, IA (US)

(72) Inventors: Dan Kluesner, Iowa Falls, IA (US); Darrin Redmond, Iowa Falls, IA (US)

(73) Assignee: Innovative Crop Solutions, Inc., Radcliffe, IA (US)

( * ) Notice: Subject to any disclaimer, the term of this patent is extended or adjusted under 35 U.S.C. 154(b) by 67 days.

(21) Appl. No.: 15/376,302

(22) Filed: Dec. 12, 2016

(65) Prior Publication Data

US 2017/0210673 A1   Jul. 27, 2017

Related U.S. Application Data

(60) Division of application No. 14/729,269, filed on Jun. 3, 2015, now abandoned, which is a continuation of application No. 13/903,184, filed on May 28, 2013, now Pat. No. 9,073,796, which is a division of application No. 12/356,163, filed on Jan. 20, 2009, now abandoned, which is a continuation of application No. 11/940,375, filed on Nov. 15, 2007, now abandoned.

(51) Int. Cl.
*C05B 17/00* (2006.01)
*C01B 25/223* (2006.01)

(52) U.S. Cl.
CPC ............ *C05B 17/00* (2013.01); *C01B 25/223* (2013.01)

(58) Field of Classification Search
CPC .............................. C05B 17/00; C05B 25/223
See application file for complete search history.

(56) References Cited

U.S. PATENT DOCUMENTS

| 5,043,007 A | 8/1991 | Davis |
| 5,851,260 A | 12/1998 | Aijala et al. |
| 5,964,917 A | 10/1999 | Latting |
| 6,878,179 B2 | 4/2005 | Porubcan |

OTHER PUBLICATIONS

Prior Product Sales, 1 page, Dec. 31, 2003.

*Primary Examiner* — Jennifer A Smith
(74) *Attorney, Agent, or Firm* — McKee, Voorhees & Sease, PLC

(57) ABSTRACT

The disclosed invention relates to novel fertilizing compounds comprising a combination of inorganic fertilizers and humic compounds. The combination produces a marked benefit over either type of substance individually, and also over previously known combinations of organic and inorganic fertilizers. The invention also relates to a method of production of such compounds.

9 Claims, No Drawings

HUMIC ACID LIGNITE COAL BASED LIQUID FERTILIZER

CROSS-REFERENCE TO RELATED APPLICATIONS

This is a Divisional Application of U.S. Ser. No. 14,729,269 filed Jun. 3, 2015, which is a Continuation of U.S. Ser. No. 13/903,184 filed May 28, 2013 (now U.S. Pat. No. 9,073,796, issued Jul. 7, 2015), which is a Divisional of U.S. Ser. No. 12/356,163 filed Jan. 20, 2009 (abandoned), which is a Continuation of U.S. Ser. No. 11/940,375 filed Nov. 15, 2007 (abandoned), herein incorporated by reference in their entirety.

FIELD OF THE INVENTION

The present invention relates to the field of agronomy, more particularly to agricultural fertilizing compounds.

BACKGROUND OF THE INVENTION

Higher plants are autotrophic organisms that can synthesize all of their molecular components from inorganic nutrients obtained from the local environment. Nitrogen is a key element in many compounds present in plant cells. It is found in the nucleoside phosphates and amino acids that form the building blocks of nucleic acids and proteins, respectively. Availability of nitrogen for crop plants is an important limiting factor in agricultural production, and the importance of nitrogen is demonstrated by the fact that only oxygen, carbon, and hydrogen are more abundant in higher plant cells. Nitrogen present in the form of ammonia or nitrate is readily absorbed and assimilated by higher plants.

Because of the dependence of plants upon nitrogen, farmers frequently include nitrogen in their fertilization efforts of their fields in an effort to increase yield. This practice may be traced back to the 1800's, when it was discovered that when external sources of water soluble forms of nitrogen (along with phosphorus and potassium) provided to plants, yield increased. These fertilizers are typically applied to the soil, but can also be applied to plant leaves directly.

Nitrogen fertilizers are often synthesized using the Haber-Bosch process, which results in the production of ammonia. The ammonia is then either applied to the soil or used to produce other nitrogen compounds, such as ammonium nitrate or urea. These compounds are then applied to crop fields in order to increase yield in areas where the nitrogen content of the soil is low.

Unfortunately, the production and use of nitrogen fertilizers has significant drawbacks. For example, it is currently estimated that ammonia production accounts for 5% of the global consumption of natural gas. With the increase of natural gas prices over the course of the past decade, the cost of producing ammonia has correspondingly increased. In addition, overuse of nitrogen fertilizer can lead to pest problems by increasing the birth rate, longevity, and overall fitness of certain crop pests. Also, there are substantial concerns regarding fertilizer runoff, which can add undesirable compounds to rivers, streams, and ground water supplies.

It would therefore be desirable to minimize the application of inorganic fertilizers to field crops while finding a way that the increased yield those fertilizers typically provide may still be obtained.

Another source of plant nutrition historically has been humus, which is commonly referred to as organic matter. Humus is sometimes referred to simply mean mature compost, and is often thought to make up the structural component of soil. Most humic compounds are produced via the composting process, but others are available from other sources, such as peat moss, manure, and coal.

Such humic compounds have been used as soil enhancers or fertilizers for quite some time, but the greater benefit seen by artificial application of inorganic compounds such as nitrogen described above have proven more beneficial in most farming applications, or at least more cost effective.

Because of this perceived greater benefit to the application of inorganic nitrogen and other compounds (such as potassium and phosphorus), the level of humic compounds present in the soil has progressively declined with the increase in commercial farming and the lack of replenishment. As a result, greater amounts of inorganic fertilizers are needed in order to achieve the same or similar fertilizing effect, as the soil in many instances is less able to retain the chemical fertilizers applied to it, and as a result plants are less able to utilize such fertilizers unless they are applied in greater quantities. This shift in soil dynamics over the course of time has contributed to the negative impacts of chemical fertilizers noted above, as with increased application of such fertilizers, there is a corresponding increase in the potential for occurrence of the negative side effects of such fertilizers.

While these problems have been recently identified, a suitable solution has yet to be found. Combining various humic substances with various inorganic fertilizing materials, such as nitrogen, phosphorus, and potassium, does result in a somewhat improved fertilizing effect. However, previously used substances have not yet achieved desired results based on the vast numbers of alternative sources of both humic compounds and inorganic complements, as well as the vast number of possible differences in composition and method of preparation. As a result, there has been a need for a compound that is able to deliver both for the benefits of humic compounds and inorganic fertilizers with a high degree of fertilizing efficacy.

BRIEF SUMMARY OF THE INVENTION

The present invention therefore relates to a fertilizer compound that reduces or eliminates one or more of the drawbacks of traditional inorganic fertilization techniques. The present invention also relates to a fertilizer compound that produces a synergistic affect between inorganic fertilizers and humic compounds. The present invention further relates to a method for producing such a fertilizer compound. Additional details regarding preferred embodiments of the present invention will become evident from the further description provided.

DETAILED DESCRIPTION

In accordance with the claims, the inventors herein disclose a novel fertilizer compound that reduces the necessity of traditional nitrogen and other inorganic fertilizations. Embodiments of the invention also can contribute to soil quality, water retention, nitrogen retention, and improved aeration.

In another aspect, a method of production of a novel fertilizer compound is disclosed by which one or more of the above-described benefits may be obtained. Further detail of the invention will be evident in the additional description herein provided.

Humic Fertilizer Composition

The claimed fertilizer composition has at least four predominant components. These include nitrogen, phosphoric acid, potassium hydroxide (potash), and an organic component. Preferably, the organic component is either lignite or leonardite. Most preferably, the organic component is lignite. Lignite may be obtained from any appropriate source, such as coal mines or their distributors.

The nitrogen in the composition may be obtained from any acceptable source, such as fertilizer dealers, farm cooperatives, and the like.

The phosphoric acid is preferably fertilizer grade phosphoric acid, rather than the more highly purified food grade phosphoric acid that is also available. It is believed that this improves the properties of the fertilizer as the fertilizer grade phosphoric acid contains additional impurities which also are sometimes present in soil and utilized by plants in small amounts. The phosphoric acid may be obtained from many chemical companies, such as Hydrite Chemical, or can be produced by various methods, such as that disclosed in U.S. Pat. No. 4,462,972. The potassium hydroxide, or potash, may also be obtained from any acceptable source, such as from any number of chemical companies.

The composition herein claimed is preferably a liquid fertilizer. It may contain between about 25% and about 63% nitrogen, between about 10% and about 50% lignite, between about 5% and about 30% phosphoric acid, between about 5% and about 10% potassium hydroxide (potash), and the remainder of the composition water. Preferably, the nitrogen makes up between about 30% to about 55% of the composition, and most preferably between about 40% and about 50% of the composition. These percentages of nitrogen are based upon a 28% liquid solution, and therefore these percentages would change if a solution with a different concentration is utilized. For example, if a 32% liquid solution is used, the fertilizer may contain between about 20% and about 60% nitrogen, preferably between about 25% and about 48%, and most preferably between about 40% and about 46%.

Preferably, the lignite makes up between about 15% and about 25% of the composition, and most preferably between about 18% and about 22% of the composition. Also, the lignite is preferably between 50 mesh size and 250 mesh size, and most preferably the lignite is 200 mesh size.

The phosphoric acid preferably makes up between about 8% and about 20% of the composition, and most preferably between about 12% and about 15% of the composition. These percentages are based upon a 75% phosphoric acid solution, and as a result the percentages will change if a different concentration solution is used. Also, the phosphoric acid is preferably fertilizer grade. Similarly, the potash preferably makes up between about 6% and about 9% of the composition, and most preferably between about 7% and about 9% of the composition. These percentages are based upon a 45% solution of potash, and as a result the relevant amounts will change if a different concentration is used. The potash may be obtained from any acceptable source, for example from a commercial chemical company such as Hydrite Chemical in Waterloo, Iowa.

This composition is applied to the target field preferably at a rate of about one-third gallon per acre. The compound is sprayed much like any other liquid fertilizer, although for best results, a 20 mesh screen should be used in order to minimize clogging of most standard spray applicators.

Applying the disclosed compound provides a substantially improved fertilizing effect over and above that expected with other fertilizing compounds, such as nitrogen or other inorganic compounds alone, organic fertilizers alone, or even pre-existing combinations of inorganic or organic compositions in fertilizer compounds.

In addition, application of the disclosed compound allows the soil to retain water and other nutrients, which provides at least two beneficial effects. First, it minimizes the likelihood of runoff of fertilizer in areas where the fertilizer is not desired, such as rivers, streams, or groundwater, thereby reducing the potential for negative environmental impact. Also, because various soil nutrients are retained at a higher rate, a lower amount of inorganic fertilizers are required to achieve the same fertilizing effect with future applications of either this fertilizing compound or other inorganic, or combination fertilizing compounds. As a result, the compound herein described provides an unexpectedly high level of benefit to both soil quality and increased fertilizing efficiency, over and above that previously achieved with similar fertilizing compounds.

Method of Production

In order to produce the above-described compound, it is preferable to use a stainless steel horizontal mixing tank with a mixer installed on each end. First, the nitrogen solution is added to the tank, followed by the lignite. While these ingredients may be added in reverse order, adding the nitrogen first is preferable as the lignite is suspended in the mixture more quickly. The nitrogen and lignite mixture is then mixed at high speed for eight minutes.

Then the phosphoric acid is added to the mixture. This also assists with suspension of the composition into a liquid. During this mixing phase, the compound may produce visible vapor. The compound should be mixed about ten to twelve minutes.

The water is then added, and the composition is mixed for a further ten minutes. Adding the water at this stage is preferable because it is easier to keep the lignite suspended in the mixture when added after the nitrogen and phosphoric acid. Finally, the potash is added. For safety reasons, it is preferable to add the potash slowly, because if it is added too fast to the mixture an explosive reaction may occur. Adding the potash also increases heat of the compound, and causes a strong odor to be emitted. The potash neutralizes the pH of the mixture, balancing out the phosphoric acid. Once the potash is added, the compound should be mixed for approximately twenty minutes.

Once the product is done with the mixing steps, it is then ready for filtration. The product is preferably slowly added to a filter screen, and preferably filtered by gravity flow. The preferred filter size is a between 20 and 70 mesh.

A majority of the product will pass through the filter, but a small amount will not pass through. The product that does not pass through should be discarded.

Once the compound has been filtered, it may be appropriately packaged for distribution to field sites. When packaging, it is preferable to add a small amount of defoaming agent before filling so that foam is minimized and containers do not have to be refilled after the foam produced in the filling process settles out. The containers may then be sealed and stored for shipment for application.

This method of production is preferable to previous methods used in several ways. For example, by adding the water later in the process, the lignite stays suspended more completely in the solution, thereby reducing clumping in the final product, which can cause clogging in the equipment used to spray the compound onto fields. Further, the use of gravity flow through the filter as opposed to a pumping procedure results in a superior product, because changes to the final structure occur when the product is forced through the screen as opposed to letting it naturally proliferate through the screen.

It should be understood that the forgoing invention has been described in the context of preferred embodiments, and that modifications apparent to one of ordinary skill in the art are intended to be encompassed within the invention. Further, the scope of the claimed invention should only be limited by the appended claims, not the scope of the specific examples provided herein.

What is claimed is:

1. A fertilizer composition prepared by a process comprising:
   (a) preparing a mixture consisting essentially of liquid nitrogen and lignite;
   (b) mixing the liquid nitrogen and lignite;
   (c) adding phosphoric acid to the mixture;
   (d) mixing the phosphoric acid with the mixture;
   (e) adding water to the mixture and phosphoric acid to form a solution;
   (f) mixing the water with the solution;
   (g) adding potash to the solution;
   (h) mixing the potash into the solution;
   (i) filtering the solution, wherein filtering is performed by gravity filtration; and
   (j) placing the solution into a container.

2. The fertilizer composition of claim 1, wherein step (b) is performed for about 8 minutes.

3. The fertilizer composition of claim 1, wherein step (d) is performed for between about 10 minutes and about 12 minutes.

4. The fertilizer composition of claim 1, wherein step (f) is performed for about 10 minutes.

5. The fertilizer composition of claim 1, wherein step (h) is performed for about 20 minutes.

6. The fertilizer composition of claim 1, wherein the phosphoric acid comprises fertilizer grade phosphoric acid.

7. The fertilizer composition of claim 1, wherein the solution is filtered in a filter screen, wherein the filter screen is between about 20 and about 200 mesh size.

8. The fertilizer composition of claim 7, wherein the filter screen is a 200 mesh size.

9. The fertilizer composition of claim 1, further comprising adding a defoaming agent.

* * * * *